(12) United States Patent
Philipp et al.

(10) Patent No.: US 12,223,741 B2
(45) Date of Patent: Feb. 11, 2025

(54) GENERATION OF ARTIFICIAL COLOR IMAGES FROM NARROW SPECTRAL BAND DATA ABOARD A CAMERA-EQUIPPED VEHICLE

(71) Applicant: GM GLOBAL TECHNOLOGY OPERATIONS LLC, Detroit, MI (US)

(72) Inventors: Tzvi Philipp, Bet Shemesh (IL); Eran Kishon, Hod Hasharon (IL); Michael Slutsky, Kefar-Saba (IL)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 17/557,448

(22) Filed: Dec. 21, 2021

(65) Prior Publication Data

US 2023/0196790 A1 Jun. 22, 2023

(51) Int. Cl.
*G06V 20/58* (2022.01)
*B60W 50/14* (2020.01)
*G02B 27/01* (2006.01)
*G06V 10/25* (2022.01)

(52) U.S. Cl.
CPC .......... *G06V 20/584* (2022.01); *B60W 50/14* (2013.01); *G02B 27/01* (2013.01); *G06V 10/25* (2022.01); *B60W 2050/146* (2013.01); *B60W 2420/403* (2013.01); *G02B 2027/0196* (2013.01)

(58) Field of Classification Search
CPC ..... G06V 20/584; G06V 10/25; B60W 50/14; B60W 2050/146; B60W 2420/403; G02B 27/01; G02B 2027/0196
See application file for complete search history.

(56) References Cited

U.S. PATENT DOCUMENTS

| | | | | |
|---|---|---|---|---|
| 2005/0111693 | A1* | 5/2005 | Loce | H04N 1/387 |
| | | | | 382/232 |
| 2009/0175535 | A1* | 7/2009 | Mattox | G06T 5/50 |
| | | | | 382/164 |
| 2018/0362053 | A1* | 12/2018 | Isa | G02B 27/00 |
| 2019/0313073 | A1* | 10/2019 | Patel | G06V 20/584 |
| 2022/0101021 | A1* | 3/2022 | Neubecker | G06T 5/77 |
| 2023/0184924 | A1* | 6/2023 | Romain | G01S 13/89 |
| | | | | 342/179 |
| 2023/0291890 | A1* | 9/2023 | Pieper | H04N 17/002 |
| 2024/0201341 | A1* | 6/2024 | Siessegger | G01S 7/484 |

\* cited by examiner

*Primary Examiner* — Andrew W Bee
*Assistant Examiner* — Winta Gebreslassie
(74) *Attorney, Agent, or Firm* — Quinn IP Law

(57) ABSTRACT

A visual perception system includes a scanning camera, color sensor with color filter array (CFA), and a classifier node. The camera captures full color pixel images of a target object, e.g., a traffic light, and processes the pixel images through a narrow band pass filter (BPF), such that the narrow BPF outputs monochromatic images of the target object. The color sensor and CFA receive the monochromatic images. The color sensor has at least three color channels each corresponding to different colors of spectral data in the monochromatic images. The classifier node uses a predetermined classification decision tree to classify constituent pixels of the monochromatic images into different color bins as a corresponding color of interest. The color of interest may be used to perform a control action, e.g., via an automated driver assist system (ADAS) control unit or an indicator device.

20 Claims, 5 Drawing Sheets

GENERATION OF ARTIFICIAL COLOR IMAGES FROM NARROW SPECTRAL BAND DATA ABOARD A CAMERA-EQUIPPED VEHICLE

INTRODUCTION

Perception camera systems commonly used aboard autonomous vehicles (AVs) are able to identify objects of interest by a host of identifying parameters, including but not limited to the geometry, color, and context of the object. Such camera systems commonly use RGB (red, green, blue) detectors/sensors to capture the full color gamut of an imaged scene. Narrow spectral band imaging systems in particular output a narrow portion of the scene's available color spectrum. The resulting monochromatic pixel images thus complicate use of such imaging systems in certain AV applications in which it is desirable to accurately identify object colors in the imaged scene. However, narrow spectral band imaging camera systems provide performance advantages over traditional cameras, including enhanced scanning capabilities and the capability of outputting higher resolution images over larger fields of view.

A liquid crystal polarized grating (LCPG) device is an exemplary type of narrow bandpass imaging system generating the above-mentioned monochrome pixel images. Diffraction gratings in an LCPG device have a narrow region in the spectral band pass where diffraction efficiency and overall transmission are maintained at a relatively high value, typically greater than 70%. In addition, due to chromatic dispersion common to diffraction gratings, a wide band pass produces large and thus undesirable chromatic dispersion effects, resulting in image blur that would severely limit the usefulness of such a device in certain AV applications. Therefore, use of a narrow spectral band pass filter is highly desirable in scanning camera applications of the types contemplated herein.

SUMMARY

Disclosed herein are camera systems and related methods for artificially generating color images from the narrow spectral band data described above, e.g., aboard a motor vehicle. In general, the camera system includes a scanning camera operable for collecting a full color scene of potentially infinite color variety. The collected light then passes through a narrow band pass filter (BPF), with resultant light thereafter sampled by a color sensor. This sampling process effectively separates the color information into three different color bins. Due to the narrow BPF, the generated image is predominantly monochromatic. Classification is then performed of desired colors based on the monochrome pixel images, after first adjusting parameters thereof to artificially color an object in the imaged scene, e.g., traffic lights, warning lights, or similar hazard warnings. For optimal performance, the approach described herein should be used in conjunction with a sensor operating on a quasi-monochromatic input, whose function it is to detect and localize traffic lights, warning signs, etc., as objects of interest to be colorized. The quasi-monochromatic images may be generated by applying learned filters of very limited spatial support, e.g., 3×3 or 5×5, to the raw data.

As part of the present approach, the narrow BPF used herein is located at an intersection between two spectral filters commonly used in color sensors. Subsequently from one exposure with two alternate color gain settings, using multiple exposures of different time durations, or using another application suitable multi-stage decision tree, any pixel may be rendered in one of three pre-defined colors of interest, e.g., red, yellow, and green in a typical three-color traffic light scenario. With some modifications as described below, the present solution may be extended to one or more additional colors, such as in a four-color traffic light scenario featuring orange or amber as an additional color.

An aspect of the present disclosure includes a visual perception system having a scanning camera, a color sensor, and a classifier node. The scanning camera is configured to capture full color pixel images of a target object, and to process the full color pixel images through a narrow BPF, such that the narrow BPF outputs monochromatic pixel images of the target object. The color sensor and an accompanying color filter array (CFA) are in communication with the narrow BPF, and are configured to receive the monochromatic pixel images therefrom. The color sensor has at least three color channels each corresponding to different colors of spectral data in the monochromatic pixel images. The classifier uses a predetermined classification decision tree to classify constituent pixels of the monochromatic pixel images into one of a plurality of color bins as a corresponding color of interest.

In some embodiments, an image processing node artificially colors the constituent pixels of the monochromatic pixel images with the corresponding color of interest to thereby generate a colorized image.

The classifier node may be configured to determine a normalized digital number value per pixel per RGB color channel, and to classify each of the constituent pixels of the monochromatic pixel images as one of at least three colors of interest by comparing the normalized digital number value to a scaled signal-to-noise ratio.

The color sensor in different exemplary embodiments is an RGB color sensor, a Bayer RGGB, or a YCCB sensor. The scanning camera may include liquid crystal polarized gratings.

The target object in a representative use case is a traffic light, with the plurality of color bins including at least red, yellow, and green. The color of interest in such an implementation includes red, yellow, or green.

The narrow BPF may have a bandwidth centered on about 600 nm in some embodiments.

The predetermined classification decision tree may operate by manipulating two independent gain settings for each color channel of a single exposure, with the two independent gain settings having different color balance parameters. Alternatively, the predetermined classification decision tree may include processing multiple exposures of the full color pixel images, with each of the multiple exposures having different time durations.

The visual perception system is configured in some embodiments to transmit an electronic signal indicative of the color of interest to an automated driver assistance system (ADAS) control unit of a motor vehicle. The visual perception system may also transmit an electronic signal indicative of the color of interest to an indicator device to thereby cause to the indicator device to illuminate and/or broadcast audible sound.

Also disclosed herein is a motor vehicle having road wheels connected to a vehicle body, an indicator device connected to the vehicle body, and a visual perception system connected to the vehicle body. In an embodiment, a scanning camera of the visual perception system is configured to capture full color pixel images of a multi-color traffic light, and to process the full color pixel images through a narrow BPF, such that the narrow BPF outputs monochromatic pixel images of the multi-color traffic light.

A color sensor of the visual perception system is equipped with a color filter array (CFA). The color sensor and the CFA are configured to receive the monochromatic pixel images from the narrow BPF. The color sensor has at least three color channels each corresponding to different colors of spectral data in the monochromatic pixel images. The classifier node is configured, using a predetermined classification decision tree, to classify constituent pixels of the monochromatic pixel images into one of a plurality of color bins as a corresponding color of interest, the plurality of color bins including red, green, and yellow, wherein the classifier node is configured to output an electronic signal to the indicator device to activate the indicator device, the output signal being indicative of the color of interest.

Also disclosed herein is a method for use aboard a motor vehicle having an indicator device and a visual perception system including a scanning camera. A possible implementation of the method includes capturing, via the scanning camera, full color pixel images of a multi-color traffic light, and then processing the full color pixel images through a narrow BPF, such that the narrow BPF outputs monochromatic pixel images of the multi-color traffic light. The method also includes receiving the monochromatic pixel images via a color sensor equipped with a color filter array (CFA). The color sensor has at least three color channels each corresponding to different colors of spectral data in the monochromatic pixel images. The method in this embodiment includes classifying constituent pixels of the monochromatic pixel images into one of a plurality of color bins as a corresponding color of interest, using a classifier node, the plurality of color bins including red, green, and yellow, and then outputting an electronic signal to an indicator device to activate the indicator device, the electronic signal being indicative of the color of interest.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

Figure 1:
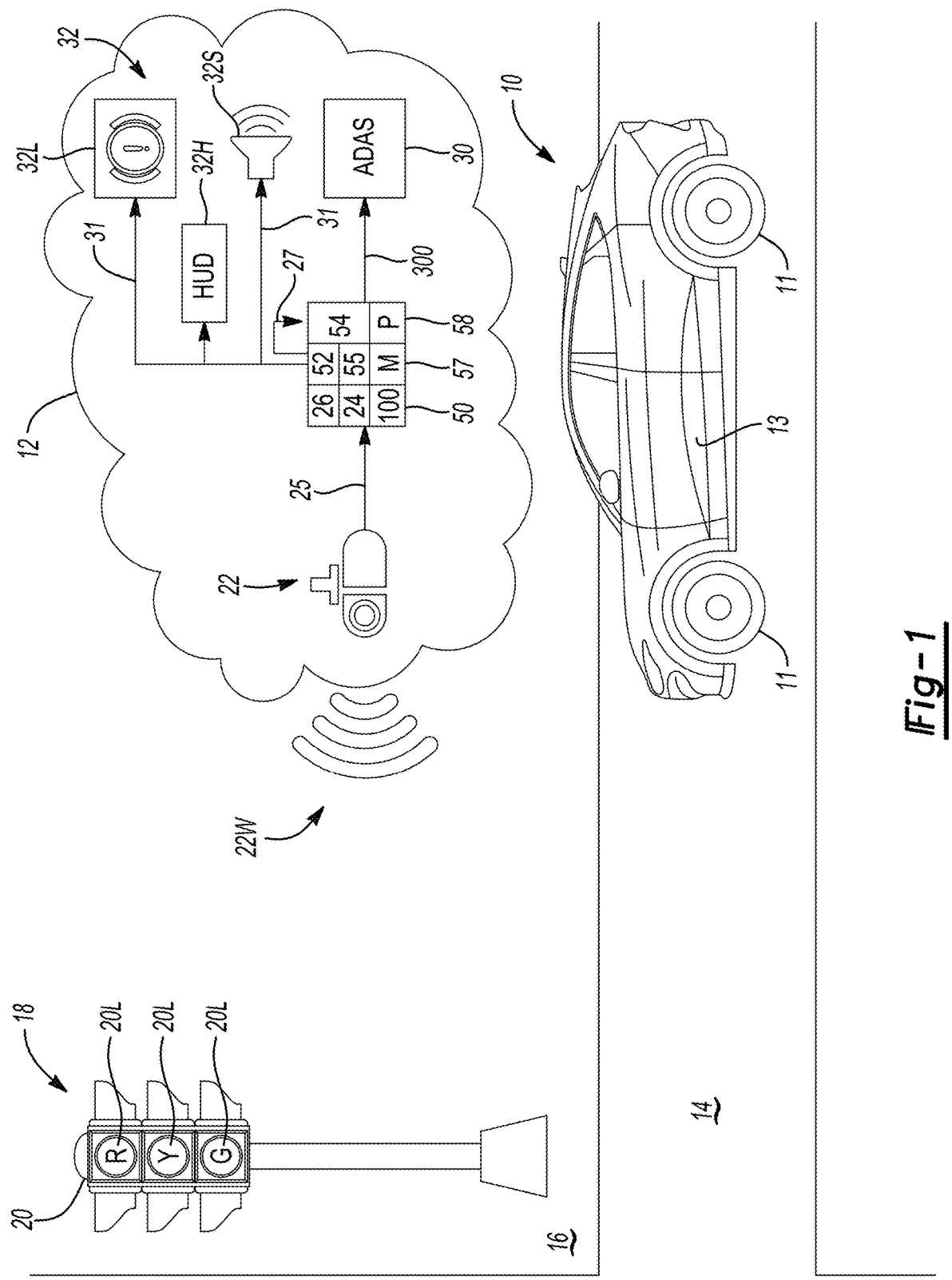
FIG. 1 is a schematic illustration of a system for generating artificial color images from narrow spectral band data in accordance with the present disclosure, and a representative motor vehicle equipped with such a system.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like features throughout the several views, FIG. 1 depicts a motor vehicle 10 equipped with road wheels 11 connected to a vehicle body 13. The motor vehicle 10 is depicted traveling along a surface 14 toward an intersection 16. Traffic flow at the intersection 16 is regulated in the illustrated example by a traffic light 18, which as depicted has separate lenses 20L illuminating in red (R), yellow (Y), and green (G). Additional colors may be present in other configurations of the traffic light, e.g., a four-light embodiment that also includes orange or amber.

For illustrative consistency and simplicity, the exemplary three-color embodiment of the traffic light 18 will be described below without limiting the present teachings to traffic lights in general, or to three-color traffic lights in particular. Likewise, the motor vehicle 10 may be variously embodied as a crossover vehicle, sport utility vehicle, passenger sedan, truck, etc. Rail vehicles, boats, robots, transport equipment, motorcycles, and the like may also benefit from the present teachings, and therefore the motor vehicle 10 of FIG. 1 is just one possible host platform for the visual perception system 12.

The motor vehicle 10 includes a visual perception system 12. As contemplated herein, the visual perception system 12 is configured to add artificial color to narrow band images of a target object, with the traffic light 18 being representative of such a target object. The present teachings are intended to improve upon present autonomous vehicle perception algorithms where monochromatic pixel image data is present. In monochromatic pixel images, it may not be possible to accurately distinguish a green light from a yellow or red light, for instance, due to the fundamentally different spectral content of the light colors. The color spectrum of a typical three-color traffic light having green, yellow, and red lights overlaps in the region of about 600 nm±15 nm, while only the tail of the green spectrum enters the same region. Thus, the relative response of a narrow BPF, e.g., the BPF 52 described below, could see a clear difference between red and green, but with little response in the blue spectrum, thereby minimizing machine perception of green light. The present solutions therefore act in this area to facilitate automated color recognition and thereafter facilitate interaction with the motor vehicle 10 or an operator thereof based on the improved color recognition capabilities enabled by the present teachings.

The visual perception system 12 as set forth herein includes a scanning camera 22 configured to image a target object, as represented by waveforms 22W, with the scanning camera or related image processing (IP) controller 50 operating using liquid crystal polarized gratings (LCPG) in some configurations. The scanning camera 22 is in communication with the IP controller 50. The IP controller 50 as contemplated herein includes a color sensor 24, a classifier node 26, the narrow BPF 52 noted above, and a color filter array 54. As appreciated in the art, the color filter array 54 includes a mosaic of color filters placed over pixel sensors of the color sensor 24 and configured to capture color information. The particular embodiment of the combined color sensor 24 and the color filter array 54 may vary with the application, with possible variations including a Bayer RGGB filter, RCCB, RCCG, RCCY, YCCB, RYYB, CYYM, or a CYGM arrangement, among other possible variations, with R, Y, and G respectively representing red, yellow, and green, and C representing clear. While shown clustered together in FIG. 1 as constituent components of the IP controller 50 for illustrative simplicity and clarity, those skilled in the art will appreciate that the color sensor 24, the classifier node 26, the narrow BPF 52, and the color filter array 54 may reside in different locations aboard the motor vehicle 10, e.g., within the scanning camera 22 or distributed as different processing nodes.

As described in detail below with reference to 2-6, the scanning camera 22 is configured to capture full color digital pixel images 25 of a target object, e.g., an area of interest 20 of the traffic light 18. The pixel images 25 are then processed through the narrow BPF 52, such that the narrow BPF 52 ultimately outputs a monochromatic pixel images 27 of the imaged target object. The color sensor 24 in turn is equipped with the color filter array 54, with the color sensor 24 and the color filter array 54 in communication with the narrow BPF 52, and thus configured to receive the monochromatic pixel images 27 therefrom. The color sensor 24 has three or more color channels each corresponding to different colors of spectral data in the monochromatic pixel images 27, i.e., red, green, or yellow in an exemplary three-color configuration of the traffic light 18.

Additionally with respect to the visual perception system 12 of FIG. 1, the classifier node 26 is configured, using a predetermined classification decision tree and prior training as set forth below, to classify constituent pixels of the monochromatic pixel images 27 into one of a plurality of different color categories or "bins" as a corresponding color of interest. Two or more color bins are contemplated herein to provide rudimentary binary classification. For added capabilities, the classifier node 26 may be trained to classify the constituent pixels of the monochromatic pixel images 27 into three or more color bins.

The visual perception system 12 may be used aboard the motor vehicle 10 to provide a myriad of performance benefits. As an illustrative example of this, the motor vehicle 10 may be equipped with an Advanced Driver Assist System (ADAS) control module 30, with the ADAS control unit 30 in turn being operable to automate dynamic control of the motor vehicle 10 in response to electronic signals (arrow 300) as an output from the IP controller 50. As appreciated in the art, associated ADAS functions may include executing a braking, steering, and/or acceleration maneuver of the motor vehicle 10 based on the output of visual perception system 12. For instance, the ADAS control unit 30 may include an automated braking system control module operable for slowing or stopping the motor vehicle 10 in response to a detected road hazard, as well as other automated systems such as automated lane changing, lane keeping, steering, collision avoidance, adaptive cruise control, etc. To that end, the visual perception system 12 is also capable of informing a driver of the motor vehicle 10, via driver alert signals (arrow 31) to an indicator device 32 such as a lamp 32L and/or speaker 32S, as to the detected color of the traffic light 18. Thus, the visual perception system 12 may be configured to transmit an electronic signal, e.g., the driver alert signals, indicative of the color of interest to illuminate and/or broadcast audible sound.

With continued reference to FIG. 1, the scanning camera 22 is configured to capture full color images of the area of interest 20 of the traffic light 18 in an exemplary use case during which the visual perception system 12 is used to detect whether the traffic light 18 is presently green, yellow, or red. A typical embodiment may utilize a complementary metal-oxide semiconductor (CMOS) sensor, a charge coupled device (CCD) sensor, or another suitable optical sensor to generate images indicating a field-of-view of the motor vehicle 10, with such a device possibly configured for continuous image generation, e.g., dozens of images per second. In the illustrated scenario of FIG. 1, the target object is or includes the traffic light 18, while in other applications the target object may include, e.g., a hazard light, a traffic control sign, or another light, sign, or other object having multiple distinct colors indicative of corresponding information.

The narrow BPF 52 noted above is configured to receive the full color images (arrow 25) from the scanning camera 22, and to output the monochromatic pixel images (arrow 27) of the target object, as noted briefly above. The color sensor 24 in turn receives the monochromatic pixel images (arrow 27) from the narrow BPF 52, with the color sensor 24 being operable for generating a three-dimensional (3D) color vector, as exemplified in FIG. 3, which is indicative of spectral content of the monochromatic pixel images (arrow 27). The classifier node 26 is configured to adjust a parameter of the above-noted 3D color vector to derive artificial color data, and to thereafter classify the artificial color data into a color bin as a color of interest.

In order to ensure that the IP controller 50 is able to quickly and accurately perform the various image processing functions detailed herein with reference to FIGS. 2-6, the IP controller 50 may be equipped with application-specific amounts of volatile and non-volatile memory (M) 57, one or more processor(s) (P) 58, and associated hardware such as a digital clock or oscillator, input/output circuitry, buffer circuitry, Application Specific Integrated Circuits (ASICs), systems-on-a-chip (SoCs), electronic circuits, and other requisite hardware needed to provide the programmed functionality. In the context of the present disclosure, the electronic control unit may execute instructions via the processor(s) to cause the IP controller 50 to receive and process the various data in performing the present methods 100 and/or 100A of FIGS. 5 and 6, embodiments of which are described below with reference to FIGS. 5 and 6. The IP controller 50 may also include an optional image processing node 55 configured to artificially color the constituent pixels of the monochromatic pixel images 27 with the corresponding color of interest to generate a colorized image, e.g., for display on the HUD 32H.

The present solutions add artificial color to narrow band images of the traffic light to improve AV perception algorithms of the visual perception system. In a monochrome image, one may not be able to distinguish green light from yellow or red light due to the different spectral content. The color spectrum of a typical three-color traffic light having green, yellow, orange, and red lights overlaps in the region of 600 nm±15 nm, while only the tail of the green spectrum enters this same region. Thus, the relative response of an LCPG narrow BPF might see a clear difference between red and green, with little response in the blue spectrum, thus minimizing perception of green light.

Figure 2:
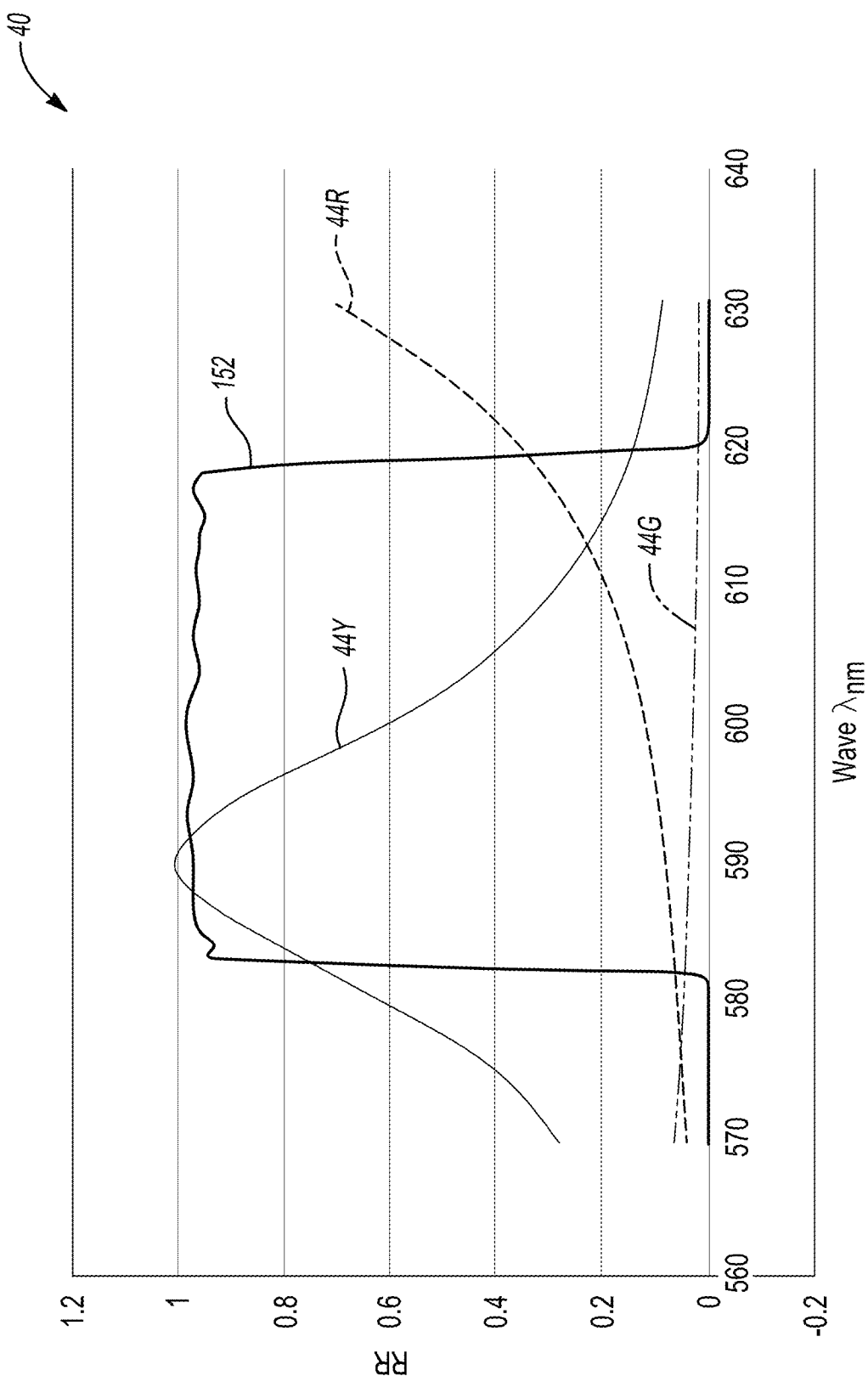
FIG. 2 is a plot of a spectral filter response and a typical traffic signal spectrum, with wavelength in nanometers (nm) shown on the horizontal axis and relative response depicted on the vertical axis.

Referring to FIG. 2, a plot 40 shows a typical spectral filter response 152 for the narrow BPF 52, for a representative green, yellow, and red traffic light spectrum, with the particular wavelengths (λ) in nanometers (nm) and relative response (RR) being depicted on the respective horizontal and vertical axes. The illustrated filter response 152 passes light in a predefined band centered on about 600 nm, or 580 nm to 620 nm (i.e., 40 nm) in an illustrated non-limiting embodiment. Traces 44Y, 44R, and 44G show the corresponding spectral data of the yellow, red, and green traffic lights, respectively. The spectral band pass of the narrow BPF 52 centered on 600 nm has a full width half maximum (FWHM) of about 30 nm in this particular example.

The narrow BPF 52, e.g., when coupled to a CMOS or CCD sensor with a standard Bayer filter pattern, will generate partial color images with a minimal blue gamut contribution to the image. Red and yellow traffic lights are still easily detected, since the spectral band width of such light sources overlaps with the spectral region of the color sensor. However, the green light spectrum peaks at about 515 nm, outside of the bandwidth of the narrow BPF 52, and thus does not register a response high enough above system noise to register a reliable signal from the blue and green channels.

Figure 3:
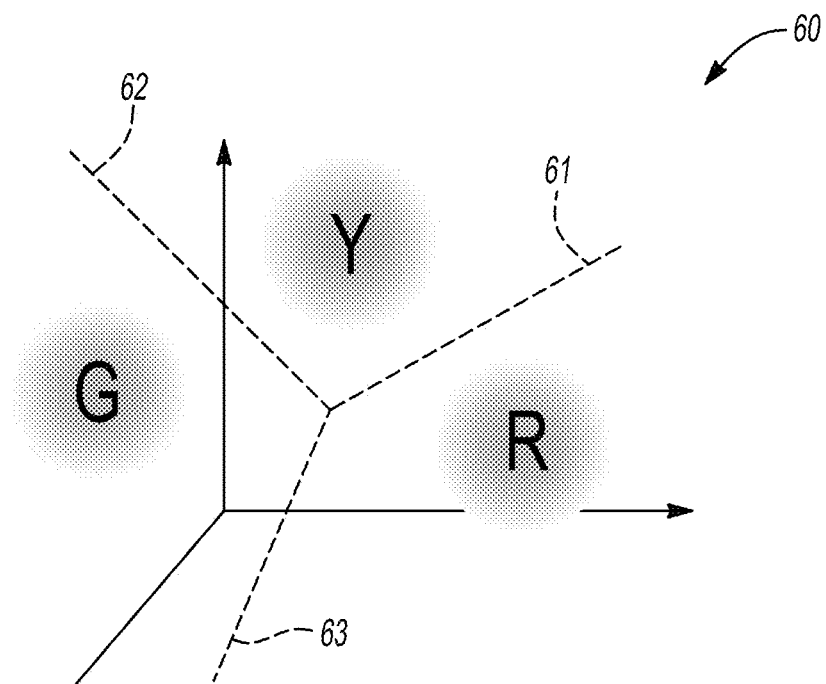
FIG. 3 is a three-dimensional vector drawing showing corresponding red, green, and blue (RGB) values for red, yellow, and green lights of a representative three-color traffic light.

Referring now to FIG. 3, the problem solved by the visual perception system 12 within the scope of the present disclosure may be posed as an N-class classification problem. For the exemplary case of the three-color traffic light 18 of FIG. 1 where N=3, i.e., red, yellow, and green, the incident light passing the narrow BPF 52 and the color filter array 54 of the color sensor 24 is encoded as a 3D vector representing the collective RGB values. Due to the diversity of the light sources, ambient lighting conditions, and camera settings, the particular mapping between the RGB values (FIG. 4) and the red, yellow, and green classes 60 of FIG. 3 is referred to as a distribution. As a simple approximation, each one of the three classes in this example may be assumed to be a Gaussian distribution centered at a specific RGB value, with some amount of variance. When representing the RGB vector in a 3D space, the "correct" color class may be determined by the IP controller 50 of FIG. 1 by finding separating hyperplanes 61, 62, and 63 between the color clusters.

Figure 4:
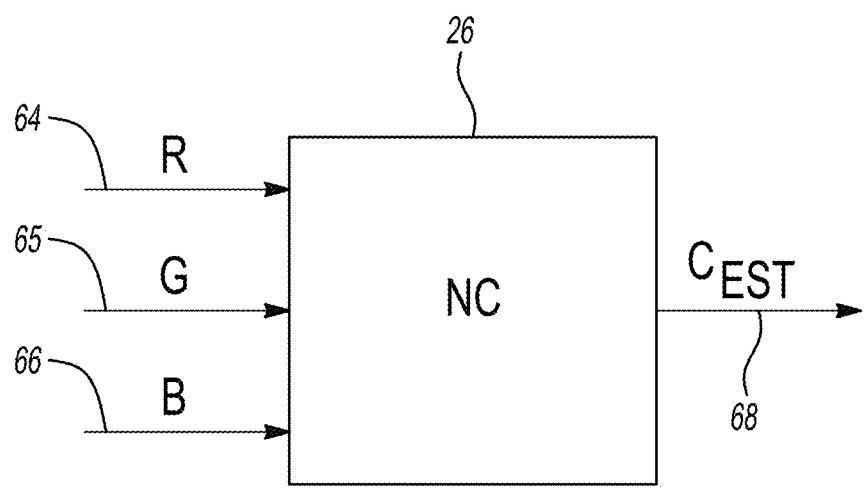
FIG. 4 is a schematic illustration of a classifier node usable as part of the system of FIG. 1.

As shown in FIG. 4, the classifier node (NC) 26 receives the RGB vector noted above, shown as its constituent color values R, G, and B (arrows 64, 65, and 66, respectively), and outputs a color estimate (arrow 68) maximizing the probability that is conditioned on the RGB inputs. The narrow BPF 52 significantly reduces the "blue" signal into the classifier node 54. Nonetheless, the small residual blue signal enables a robust separation of three or more colors. To this end, the classifier node 26 adjusts a parameter of the RGB vector to derive artificial color data, doing so using one of several possible alternative methodologies as described below. The classifier node 26 thereafter classifies the artificial color data into different color bins as a color of interest, e.g., red, yellow, or green light in the non-limiting three-color traffic light use case of FIG. 1.

Classifier Node Functions: continuing with the three-color traffic light 18 example, one may assume a simple Gaussian distribution for the three colors, and therefore it is sufficient for the purposes of the present solution to sample representative images covering a wide diversity of light in this spectrum, and under various ambient illumination conditions. For example, the classifier node 26 may be trained with sample images of reference red, yellow, and green lights of the same or similar spectrum as those used in the traffic light 18 of FIG. 1, at different times of day and at night, during inclement weather, etc. The IP controller 50 may find the mean ($\mu_i$) and variance ($\sigma_i^2$) or each color (i), with the classifier node 26 calculating the probability of a specific color (i) as follows:

$$Prob(i \mid x) = N(x \mid \mu_i, \sigma_i^2) = \frac{1}{(2\pi\sigma_i^2)^{\frac{1}{2}}} \exp\left\{\frac{-(x-\mu_i)^2}{2\sigma_i^2}\right\}$$

where x==RGB input signal, i=[Red, Yellow, Green], and the predicted color (i)=Argmax,Prob(i|x).

Here, x, $\mu$, and $\sigma^2$ are 3D vectors. The index "i" represents the specific color. The number of classes (i.e., colors) may be increased if distinguishable using the reduced frequency responses available after the narrow BPF 52. Supervised learning-based N-class classification schemes may be used where a simple Gaussian distribution model is not sufficient, such as but not limited to logistic regression, multi-class support vector machines (SVM), decision trees, and neural networks. In learning-based methods, a set of representative images may be used to train the classifier node 26 and identify its optimal parameters. This learning-based approach may be optimal for deriving artificial color rendering within the scope of the disclosure.

Independent Gain Settings: an approach to implementing the present teachings is to apply two independent gain settings (digital or analog) to the captured RGB data, with the gain settings having different color balance parameters. As an example, the relative gain (amplifications) per color channel could be set according to a table for each frame:

| COLOR CHANNEL | GAIN SET1 | GAIN SET2 |
|---|---|---|
| RED | 1.2 | 1 |
| GREEN | 1 | 1.3 |
| BLUE | 1 | 1 |

The maximum digital number (Dn) is found for each exposure. For reference, the maximum Dn for a representative 8-bit embodiment of the color sensor 24 of FIG. 1 is 256. Then, the DnR,G,B value per pixel is found per color channel, and the IP controller 50 calculates the normalized value, i.e.:

$$\frac{D_{n_{R,G,B}}}{D_{n_{max}}}$$

Figure 5:
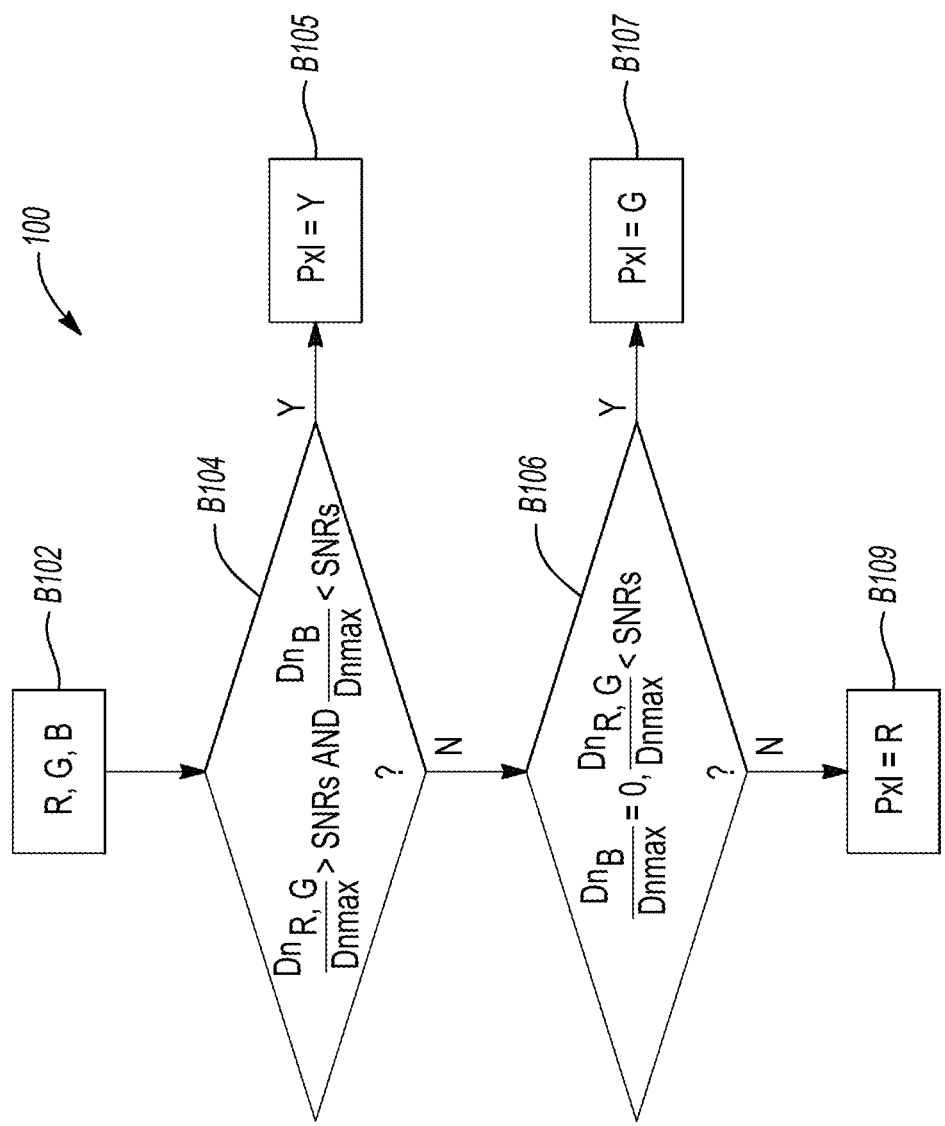
FIGS. 5 and 6 are flow charts describing methods for identifying a particular color of light using the system of FIG. 1 for a three-color or four-color traffic light, respectively.

This process generates six values from the two gain sets and the three RGB values, e.g., arrows 64, 65, and 66 of FIG. 4, which are then used in the method 100 of FIG. 5 to determine the color of the imaged target object.

It is assumed herein that the noise of the camera system has been measured as part of the normal calibration process, and assigned a value of a. Therefore, the scene signal-to-noise ratio (SNR) is calculated for the purposes of this derivation as $$SNR = \frac{Dn}{\sigma},$$

taken from the maximum signal in the imaged scene. This value is then scaled by a scaling parameter (P1) determined during the calibration process. The single value of the scaling parameter (P1) is determined by calibrating the camera against reference light sources used in the standard traffic lights that comply with the expected spectral distributions for such devices. Since P1 is a scaling number, its value may be determined by running the algorithm multiple times until convergence is demonstrated. The scaled SNRs is thus represented as $$\frac{SNR}{P1}.$$

Referring now to FIG. 5, an exemplary embodiment of the method 100 is provided for identifying red, yellow, and green light of the three-color traffic light 18 of FIG. 1, with FIG. 5 describing classification functions of the classifier node 26. It is assumed herein that the traffic light 18 is identifiable by other traditional means, such as object recognition, in order to allow the method 100 to proceed in an area of interest of the traffic light 18 without concern for surrounding colors in the imaged scene. Those skilled in the art will appreciate that the method 100 may be used to identify other colors, and therefore red, yellow, and green are illustrative of just one application of the present teachings. The flow chart of FIG. 5 represents a decision process via the above-described criterion, and commences with block B102 with generation of pixelwise red, green, and blue (RGB) data, i.e., arrows 64, 65, and 66 of FIG. 4 as described above. The collective RGB data may be adjusted by, e.g., the two color gains noted above, by multiple exposures of different durations, or using other decision trees in different embodiments. Block B102 results in the values $$\frac{D_{n_{R,G,B}}}{D_{nmax}}$$

and SNRs as set forth above. The method 100 then proceeds to block B104.

Block B104 entails comparing the above values to each other, e.g., using a comparator circuit of the IP controller 50. If $$\frac{D_{n_{R,G}}}{D_{nmax}}$$

exceed SNRs, and at the same time $$\frac{D_{n_B}}{D_{nmax}}$$

is less than SNRs, the classifier node 26 proceeds to block B105. The method 100 otherwise proceeds to block B106.

At block B105, the IP controller 50 may record an alphanumeric code in memory, with the code being indicative of the pixel color being yellow in this example.

Block B106 performs a different comparison in response to a negative decision at block B104. Here, the classifier node 26 determines if two normalized values of $$\frac{D_{n_B}}{D_{nmax}}$$

equal zero, and if the normalized values $$\frac{D_{n_{R,G}}}{D_{nmax}}$$

are less than the scaled signal-to-noise ratio, i.e., SNRs. The method 100 proceeds to block B107 when both conditions are true, and to block B109 in the alternative.

Block B107 of FIG. 5 includes recording an alphanumeric code in memory 57, with the code being indicative of the pixel color being green. Accordingly, block B107 is analogous to block B105.

Block B109 includes recording an alphanumeric code in memory 57 that is indicative of the pixel color being red. Like block B107, therefore, block B109 is analogous to block B105.

Figure 6:
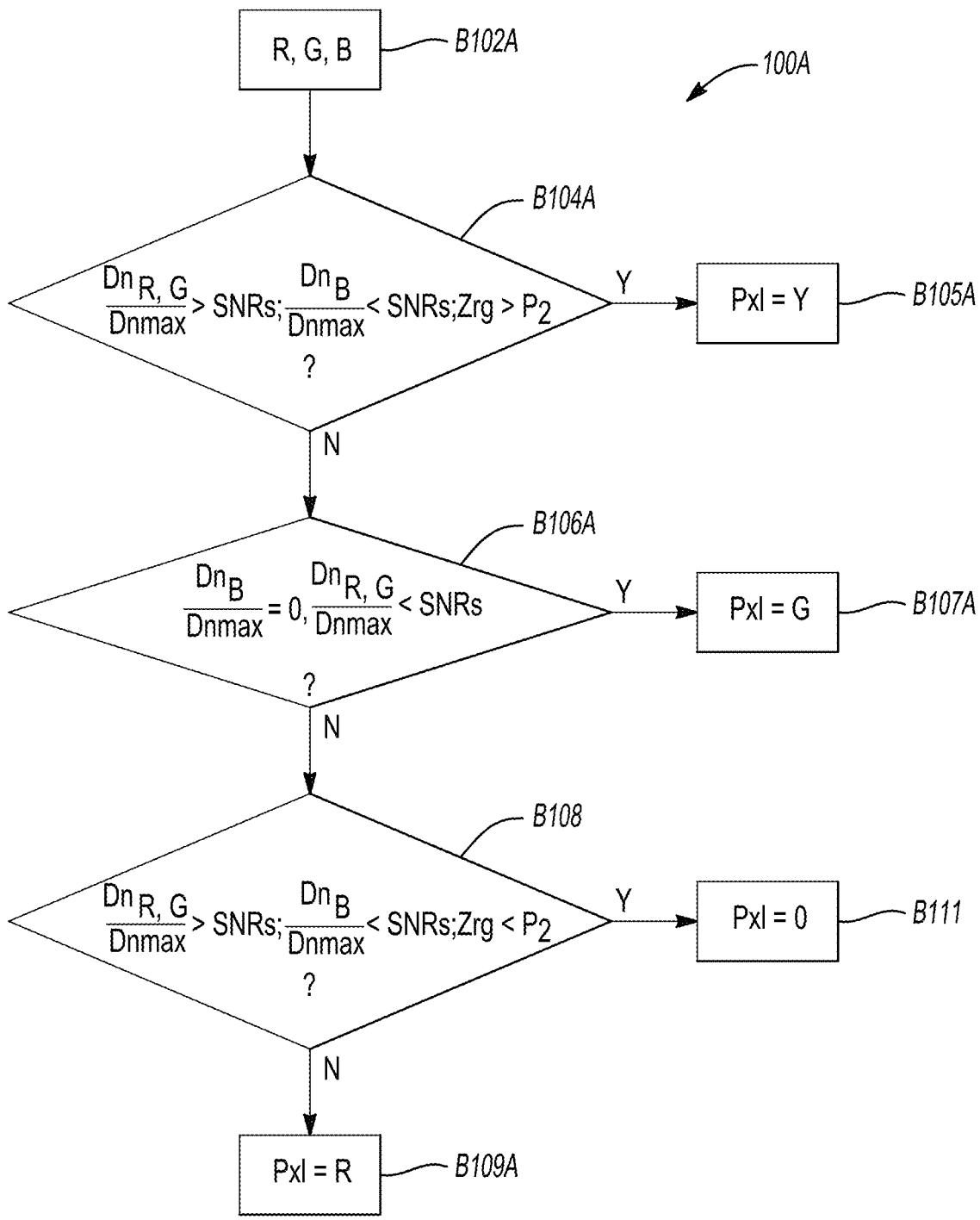

Those skilled in the art will appreciate that additional colors may be classified in accordance with the present teachings, with a minor modification to the flowchart of FIG. 5. For instance, a method 100A as shown in FIG. 6 performs a four-color classification, such as might be performed with a four-color traffic light having red, green, yellow, and orange/amber lights. To this end, method 100A uses an additional measured point. This point may be determined as the ratio between the green and red values, i.e., $$Zrg = \frac{G}{R}.$$

This additional parameter helps the IP controller 50 of FIG. 1 to distinguish between the yellow and orange light spectra based on a difference in the constituent quantity of green light in the yellow and orange light. This value is compared to another calibrated parameter, P2, determined in the calibration process by iteration versus orange light sources, i.e., when training the classifier node 26.

Beginning with block B102A, which is analogous to block B102 of FIG. 4, the pixel wise RGB data is determined via the ECU. In this instance, the RGB data will include $$\frac{D_{n_{R,G,B}}}{D_{nmax}},$$

SNRS, Zrg, and P2. Once determined, the method 100A proceeds to block B104A.

At block B104A the IP controller 50 next determines whether $$\frac{D_{n_{R,G}}}{D_{nmax}}$$

exceed the SNRs, $$\frac{D_{n_B}}{D_{nmax}}$$

is less than SNRs, and Zrg exceeds the calibrated value P2. The method 100A proceeds to block B105A if this is the case, and to block B106A in the alternative.

At block B105A, which is analogous to block B105, the IP controller 50 registers an alphanumeric code in memory 57 that is indicative of the pixel color being yellow.

Block B106A is analogous to block B106, and similarly includes determining if any two of the normalized values $$\frac{D_{n_B}}{D_{nmax}}$$

equal zero, and it the normalized values $$\frac{D_{n_{R,G}}}{D_{nmax}}$$

are less than the scaled signal-to-noise ratio SNRs. The method 100A proceeds to block B107A when both conditions are true, and to block B108 in the alternative.

Block B107A includes registering an alphanumeric code in memory 57 that is indicative of the pixel color being green, similar to block B107 of FIG. 4.

At block B108, the IP controller 50 again evaluates the parameters Zrg and P2. Block B108 is analogous to block 104A, with the exception of verifying that Zrg is less than P2. The method 100A proceeds to block B111 when the conditions of block B108 have been satisfied, and to block B109A in the alternative.

Block B109A entails registering an alphanumeric code in memory 57 that is indicative of the pixel color being red.

Block B111 entails registering an alphanumeric code in memory 57 indicative of the pixel color being orange.

RED LIGHT: the present solutions may be understood with reference to a working example. Using a red traffic light with representative RGB values of 255, 31, 3, i.e., R=255, G=31, and B=3, the value of Dnmax is 255. For two exposures at the representative gain settings noted above, the resultant average Dn values are:

| Color Channel | Gain Set 1 | Gain Set 2 |
|---|---|---|
| Red | 26 | 22 |
| Green | 17 | 22 |
| Blue | 0 | 0 |

The subsequent six values of $$\frac{D_{n_{R,G,B}}}{D_{nmax}}$$

are thus calculated as:

| Color Channel | Gain Set 1 | Gain Set 2 |
|---|---|---|
| Red | 0.102 | 0.086 |
| Green | 0.067 | 0.090 |
| Blue | 0 | 0 |

Following the flow chart of FIG. 4, with an exemplary SNRs value of 0.072, the IP controller 50 would flow from block B102, to block B104, to block B106, to block B109. Thus, the particular color returned from this exemplary set of data would be red. Hence, an object resembling a traffic light, and having the exemplary RGB values shown above, could be artificially "colored" red in monochrome images generated by the RGB sensor, whether in logic of the IP controller 50 or in an actual displayed image. The ADAS control unit 30 of FIG. 1 in an embodiment could command a braking response of the motor vehicle 10 as needed, e.g., by modulating braking force based on the operator's braking response to the red light, vehicle speed trajectory, etc., or the operator could simply be alerted to the existence of the red light with an audible, visible, and/or tactile alert, a heads-up display (HUD) 32H, etc. The devices 32L, 32S, and/or 32H of FIG. 1 could be energized for this purpose.

YELLOW LIGHT: in another example, a yellow traffic light may be imaged with representative RGB values of 255, 213, and 4. For two exposures at the previously described gain settings, the resultant average Dn values are:

| Color Channel | Gain Set 1 | Gain Set 2 |
|---|---|---|
| Red | 145 | 121 |
| Green | 91 | 119 |
| Blue | 8 | 8 |

The subsequent six values of $$\frac{D_{n_{R,G,B}}}{D_{nmax}}$$

are thus calculated as:

| Color Channel | Gain Set 1 | Gain Set 2 |
|---|---|---|
| Red | 0.568 | 0.474 |
| Green | 0.357 | 0.467 |
| Blue | 0.031 | 0.031 |

Following the flow chart of FIG. 4, with an exemplary SNRs of 0.072, the ECU would flow from block B102, to block B104, to block B105. Thus, the color returned from this exemplary set of data would be yellow. Hence, an object resembling the traffic light 18, if identified in a collected image, having the RGB values shown above, could be artificially "colored" yellow in monochrome pixel images generated by the color sensor. The ADAS control unit 30 of FIG. 1 in a possible embodiment could be triggered to speed up the motor vehicle 10 or slow it down as needed depending on the operator's response to the yellow light, vehicle speed trajectory, etc., or the operator could simply be alerted to the existence of the yellow light with an audible, visible, and/or tactile alert, a heads up display, etc.

GREEN LIGHT: in yet another example of the present teachings, a green traffic light may be imaged with representative RGB values of 22, 248, and 164. For two exposures at the previously described gain settings, the resultant average Dn values are:

| Color Channel | Gain Set 1 | Gain Set 2 |
|---|---|---|
| Red | 9 | 7 |
| Green | 5 | 6 |
| Blue | 0 | 0 |

The subsequent six values of $$\frac{D_{n_{R,G,B}}}{D_{n_{max}}}$$

are thus calculated as:

| Color Channel | Gain Set 1 | Gain Set 2 |
|---|---|---|
| Red | 0.035 | 0.027 |
| Green | 0.019 | 0.024 |
| Blue | 0 | 0 |

Following the flow chart of FIG. 4, with the same exemplary SNRs of 0.072, the IP controller 50 would flow from block B102, to block B104, to block B106, to block B107. Thus, the color returned from this exemplary set of data would be green. Hence, an imaged target object resembling the traffic light 18 of FIG. 1 having the RGB values shown above, could be artificially "colored" green in monochrome pixel images 27 generated by the color sensor 24.

In the methods 100 and 100A of FIGS. 5 and 6, artificial coloring of the pixels may occur prior to de-mosaic and prior to gamma correction, or the approach may eschew the use of de-mosaic processes altogether. As appreciated in the art, typical de-mosaic algorithms would not be expected to perform well on post-BPF raw images. One working within the scope of the disclosed methods 100 and 100A could therefore separately group R, G, and B pixels that fall within a given area of interest to be colorized. The described classification strategy will then operate on these sets of pixels. Additionally, if the color filter array 54 is not of the RGB type, an appropriate color transformation should be applied to the outputs of the color filter array 54 so that the described methods 100 and 100A will operate in the RGB space as intended.

Aspects of this disclosure may be implemented, in some embodiments, through a computer-executable program of instructions, such as program modules, referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, e.g., the processor 58, (b) a controller, e.g., the IP controller 50, and/or (c) another suitable processing device. Algorithms, software, control logic, protocols, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used. Additionally, instructions embodying the methods 100 or 100A may be recorded on non-transitory, computer-readable storage medium. The instructions, when executed by the processor 58, cause the IP controller 50 to perform the above-described processes.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A visual perception system comprising:
 a liquid crystal polarized gratings (LCPG) scanning camera configured to capture full color pixel images of a target object, and to process the full color pixel images through a narrow band pass filter (BPF), such that the narrow BPF outputs monochromatic pixel images of the target object, wherein the narrow BPF is centered on about 600 nanometers (nm), has a bandwidth of about 40 nm, and a full width half maximum (FWHM) of about 30 nm;
 a color sensor equipped with a color filter array (CFA), wherein the color sensor and the CFA are configured to receive the monochromatic pixel images from the narrow BPF, and wherein the color sensor has at least three color channels each corresponding to different colors of spectral data in the monochromatic pixel images; and
 a classifier node configured, using a predetermined classification decision tree, to classify constituent pixels of the monochromatic pixel images into one of a plurality of color bins as a corresponding color of interest, including calculating respective probabilities of the constituent pixels being red, yellow, or green as the corresponding color of interest, and thereafter outputting a color estimate having a maximum of the probabilities.

2. The visual perception system of claim 1, further comprising an image processing node configured to artificially color the constituent pixels of the monochromatic pixel images with the corresponding color of interest to thereby generate a colorized image.

3. The visual perception system of claim 1, wherein the classifier node is configured to determine a normalized digital number value per pixel per RGB color channel, and to classify each of the constituent pixels of the monochromatic pixel images as one of the red, the yellow, or the green by comparing the normalized digital number value to a scaled signal-to-noise ratio.

4. The visual perception system of claim 1, wherein the color sensor includes an RGB color sensor.

5. The visual perception system of claim 1, wherein the color sensor includes a Bayer RGGB sensor.

6. The visual perception system of claim 1, wherein the predetermined classification decision tree includes manipulating two independent gain settings for each color channel of a single exposure, the two independent gain settings having different color balance parameters.

7. The visual perception system of claim 1, wherein the predetermined classification decision tree includes processing multiple exposures of the full color pixel images, each of the multiple exposures having different time durations.

8. The visual perception system of claim 1, wherein the visual perception system is configured to transmit an electronic signal indicative of the color of interest to an automated driver assistance system (ADAS) control unit of a motor vehicle.

9. The visual perception system of claim 1, wherein the visual perception system is configured to transmit an electronic signal indicative of the color of interest to an indicator device to thereby cause to the indicator device to illuminate and/or broadcast audible sound.

10. The visual perception system of claim 1, wherein the color sensor incudes a YCCB sensor.

11. A vehicle comprising:
a vehicle body;
an indicator device connected to the vehicle body; and
a visual perception system connected to the vehicle body and comprising:
  a liquid crystal polarized gratings (LCPG) scanning camera configured to capture full color pixel images of a multi-color traffic light, and to process the full color pixel images through a narrow band pass filter (BPF), such that the narrow BPF outputs monochromatic pixel images of the multi-color traffic light, wherein the narrow BPF filter is centered on about 600 nanometers (nm), has a bandwidth of about 40 nm, and a full width half maximum (FWHM) of about 30 nm;
  a color sensor equipped with a color filter array (CFA), wherein the color sensor and the CFA are configured to receive the monochromatic pixel images from the LCPG scanning camera, and wherein the color sensor has at least three color channels each corresponding to different colors of spectral data in the monochromatic pixel images; and
  a classifier node configured, using a predetermined classification decision tree, to classify constituent pixels of the monochromatic pixel images into one of a plurality of color bins as a corresponding color of interest, including calculating respective probabilities of each of the constituent pixels being red, green, or yellow as the corresponding color of interest, and outputting a color estimate having a maximum of the probabilities, the plurality of color bins including red, green, and yellow, wherein the classifier node is configured to output an electronic signal to the indicator device to activate the indicator device, the output signal being indicative of the color of interest.

12. The vehicle of claim 11, wherein the indicator device includes a heads-up display.

13. The vehicle of claim 11, further comprising an automated driver assist system (ADAS) control unit operable for selectively controlling a dynamic state of the vehicle in response to the color of interest.

14. The vehicle of claim 11, wherein the classifier node is configured to determine a normalized digital number value per pixel per RGB color channel, and to classify each of the constituent pixels of the monochromatic pixel images as one of at least three colors of interest, by comparing the normalized digital number value to a scaled signal-to-noise ratio.

15. The vehicle of claim 11, wherein the predetermined classification decision tree includes manipulating two independent gain settings for each color channel of a single exposure, the two independent gain settings having different color balance parameters.

16. The vehicle of claim 11, further comprising:
a set of road wheels connected to the vehicle body.

17. The vehicle of claim 11, wherein the predetermined classification decision tree includes processing multiple exposures of the full color images, each of the multiple exposures having different time durations.

18. A method for use aboard a host platform having an indicator device and a visual perception system including a liquid crystal polarized gratings (LCPG) scanning camera, the method comprising:
capturing, via the (LCPG) scanning camera, full color pixel images of a multi-color traffic light;
processing the full color pixel images through a narrow band pass filter (BPF), such that the narrow BPF outputs monochromatic pixel images of the multi-color traffic light, wherein the narrow BPF is centered on about 600 nanometers (nm), has a bandwidth of about 40 nm, and a full width half maximum (FWHM) of about 30 nm;
receiving the monochromatic pixel images via a color sensor equipped with a color filter array (CFA), wherein the color sensor has at least three color channels each corresponding to different colors of spectral data in the monochromatic pixel images; and
classifying constituent pixels of the monochromatic pixel images into one of a plurality of color bins as a corresponding color of interest, using a classifier node, the plurality of color bins including red, green, and yellow, including calculating respective probabilities of each of the constituent pixels being red, yellow, or green as the corresponding color of interest; and
outputting an electronic signal to an indicator device to activate the indicator device, the electronic signal being indicative of the color of interest, wherein the color of interest is a color estimate having a maximum of the probabilities.

19. The method of claim 18, further comprising selectively controlling a dynamic state of the host platform via an automated driver assist system (ADAS) control unit in response to the color of interest.

20. The method of claim 18, further comprising calculating a normalized digital number value per pixel per RGB color channel, via the classifier node; and
classifying each of the constituent pixels of the monochromatic pixel images as one of at least three colors of interest, including comparing the normalized digital number value to a scaled signal-to-noise ratio.

* * * * *